(12) United States Patent
Song

(10) Patent No.: US 10,642,499 B2
(45) Date of Patent: May 5, 2020

(54) MEMORY CONTROLLER, MEMORY SYSTEM INCLUDING THE SAME, AND OPERATION METHOD THEREOF

(71) Applicant: SK hynix Inc., Gyeonggi-do (KR)

(72) Inventor: Young-Ook Song, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/939,962

(22) Filed: Mar. 29, 2018

(65) Prior Publication Data

US 2019/0065056 A1 Feb. 28, 2019

(30) Foreign Application Priority Data

Aug. 30, 2017 (KR) ......................... 10-2017-0110031

(51) Int. Cl.
*G06F 3/06* (2006.01)
*G06F 12/02* (2006.01)
*G06F 13/16* (2006.01)

(52) U.S. Cl.
CPC ............ *G06F 3/061* (2013.01); *G06F 3/0658* (2013.01); *G06F 3/0659* (2013.01); *G06F 3/0673* (2013.01); *G06F 12/0238* (2013.01); *G06F 13/1668* (2013.01); *G06F 2212/1008* (2013.01); *G06F 2212/1016* (2013.01); *G06F 2212/7203* (2013.01)

(58) Field of Classification Search
CPC ...... G06F 3/061; G06F 3/0658; G06F 3/0659; G06F 3/0673
See application file for complete search history.

(56) References Cited

U.S. PATENT DOCUMENTS

| | | | | |
|---|---|---|---|---|
| 6,088,772 | A * | 7/2000 | Harriman | G06F 13/1631 711/158 |
| 6,182,177 | B1 * | 1/2001 | Harriman | G06F 13/18 710/112 |
| 2010/0153636 | A1 * | 6/2010 | Huang | G06F 12/0607 711/105 |
| 2010/0161923 | A1 * | 6/2010 | GadelRab | G06F 12/02 711/162 |
| 2017/0177241 | A1 * | 6/2017 | Erickson | G06F 3/0611 |
| 2018/0232178 | A1 * | 8/2018 | Iwaki | G06F 3/0659 |
| 2019/0065056 | A1 * | 2/2019 | Song | G06F 3/061 |

FOREIGN PATENT DOCUMENTS

| | | |
|---|---|---|
| KR | 100878125 | 1/2009 |
| KR | 1020160094764 | 8/2016 |

* cited by examiner

*Primary Examiner* — Ramon A. Mercado
(74) *Attorney, Agent, or Firm* — IP & T Group LLP

(57) ABSTRACT

Disclosed is a memory controller including a command decoder suitable for generating a data identifier of read data by decoding a read command, an update unit suitable for updating information of the read data in response to the data identifier of the read data, and a data output control unit suitable for storing data read from a memory device according to the read command, and selectively outputting the stored data as the read data based on the updated information.

19 Claims, 4 Drawing Sheets

| DATA_ID | READY | ORDER | TIME | VAILD |
|---------|-------|-------|------|-------|
| 0 | L | - | L | L |
| 1 | H | 0 | H | H |
| 2 | H | 1 | H | H |
| 3 | L | 2 | H | H |
| 4 | L | - | L | L |
| 5 | H | 3 | L | H |
| ⋮ | ⋮ | ⋮ | ⋮ | ⋮ |
| 255 | L | - | L | L |

MEMORY CONTROLLER, MEMORY SYSTEM INCLUDING THE SAME, AND OPERATION METHOD THEREOF

CROSS-REFERENCE TO RELATED APPLICATION

The present application claims priority under 35 U.S.C. § 119 to Korean Patent Application No. 10-2017-0110031, filed on Aug. 30, 2017, which is incorporated herein by reference in its entirety.

BACKGROUND

1. Field

Exemplary embodiments relate to a memory system including a memory controller, and more particularly, to a memory system for processing data read from a memory device, and an operation method thereof.

2. Discussion of the Related Art

A memory system is used as a main memory device or auxiliary memory device for various electronic devices for consumers or industries, for example, a computer, mobile phone, portable digital assistant (PDA), digital camera, game machine, navigation system and the like. Memory devices constructing a memory system may include volatile memory devices such as a dynamic random-access memory (DRAM) and static RAM (SRAM) and nonvolatile memory devices such as a read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magnetoresistive RAM (MRAM), resistive RAM (RRAM) and flash memory.

The memory system is operated in response to commands inputted from a host electronic device. In this case, data corresponding to the commands may not be sequentially processed. For example, when the memory system performs read operations in response to read commands which are sequentially inputted, the read operations of the memory device may be performed at different speeds, depending on errors which occur in read data corresponding to the respective read commands. Therefore, although certain data has been processed earlier by the memory device, the memory system needs to decide the priority of the data in consideration of the request schedule of the host.

SUMMARY

Various embodiments of the present invention are directed to a memory controller, a memory system including the memory controller and an operating method thereof capable of deciding a processing priority for a received read operation request based on a plurality of read operation requests and a read operation result, and processing read data according to the processing priority, and an operating method thereof.

In accordance with an embodiment of the present invention, a memory controller includes: a command decoder suitable for generating a data identifier of read data by decoding a read command; an update unit suitable for updating information of the read data in response to the data identifier of the read data; and a data output control unit suitable for storing data read from a memory device according to the read command, and selectively outputting the stored data as the read data based on the updated information.

In accordance with an embodiment of the present invention, operating method for a memory system includes: generating a data identifier of read data by decoding a read command; updating information of the read data according to the data identifier of the read data; storing data read from a memory device according to the read command; and selectively outputting the stored data as the read data based on the updated information.

In accordance with an embodiment of the present invention, a memory system includes: a memory device suitable for providing stored data in response to read commands; and a memory controller suitable for setting an order of provided data, and outputting to a host the provided data in the set order.

These and other features and advantages of the present invention will become apparent to those with ordinary skill in the art to which the present invention belongs from the following description in conjunction with the accompanying drawings.

BRIEF DESCRIPTION OF THE DRAWINGS

FIG. 3 is a table illustrating information stored in a mapping table according to an operation of the memory controller shown in FIG. 2, in accordance with an embodiment of the present invention.

DETAILED DESCRIPTION

Figure 1:
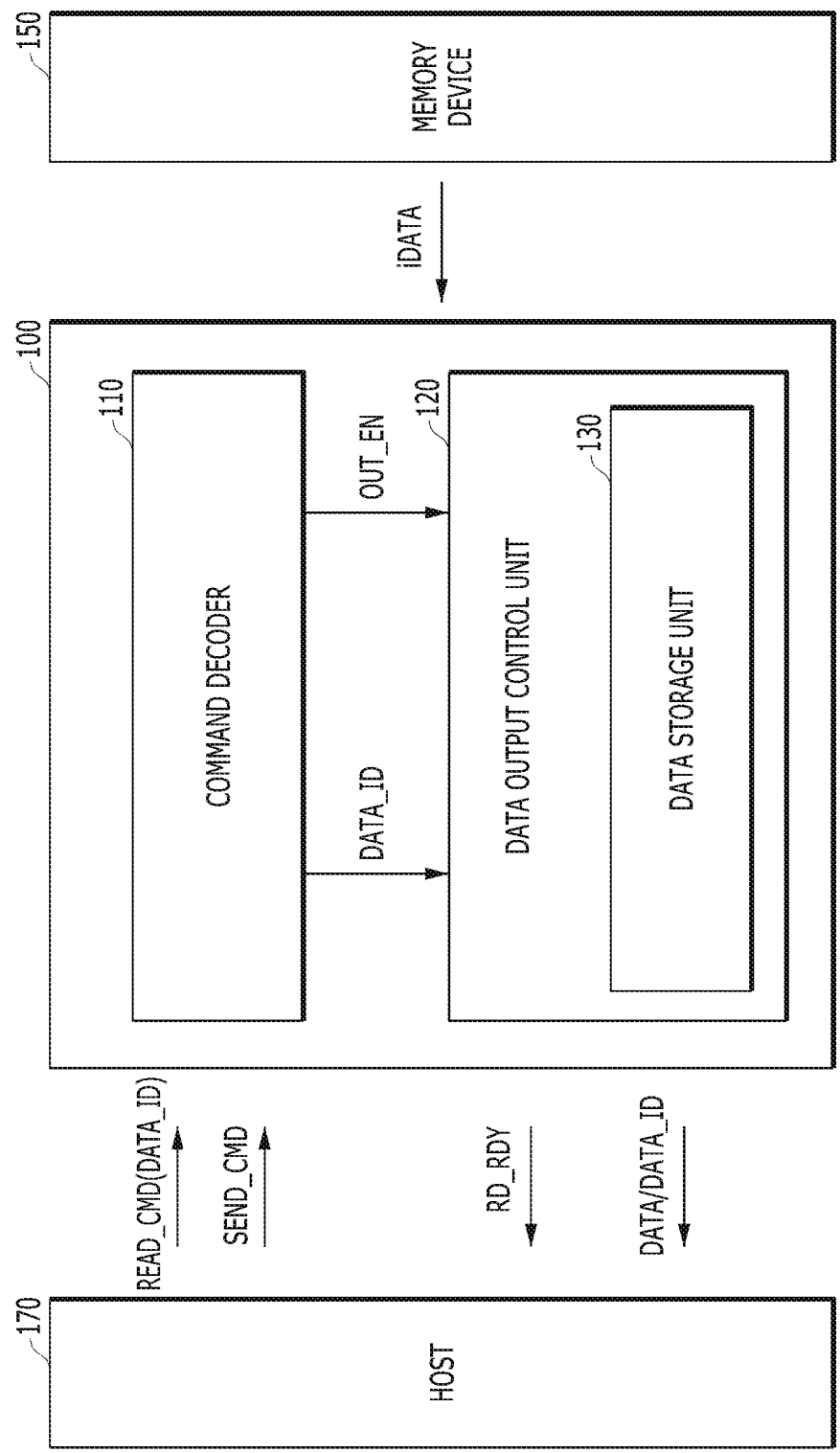
FIG. 1 is a block diagram illustrating a memory system including a memory controller operatively coupled to a memory device, and to a host, in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In describing the present disclosure, when it is determined that the detailed description of the known related art may obscure the gist of the present disclosure, the detailed description thereof will be omitted.

Although the terms such as first and second may be used to describe various components, the components are not limited by the terms, and the terms are used only to distinguish components from other components.

The terminology used herein is for the purpose of describing particular embodiments only and is not intended to be limiting of the present invention. As used herein, singular forms are intended to include the plural forms as well, unless the context clearly indicates otherwise.

It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a memory system including a memory controller 100, in accordance with an embodiment of the present invention. It is noted that FIG. 1 is a simplified block schematic which illustrates only those components which relate to the described embodiment of the invention and are necessary for understanding the embodiment. It should be understood that a plurality of other well-known components may also be included in the memory controller 100.

Referring to FIG. 1, the memory controller 100 may include a command decoder 110 and a data output control unit 120. The memory controller 100 may control the overall operations of a memory device 150 in response to a command inputted from a host 170. For example, the memory controller 100 may control the write, read and erase operations of the memory device 150.

During a read operation, the memory controller 100 may read data iDATA from the memory device 150 in response to a read command READ_CMD inputted from the host 170. The memory controller 100 may store the read data iDATA, and output the stored data iDATA as read data DATA to the host 170 in response to a send command SEND_CMD inputted from the host 170.

The memory controller 100 may schedule and process data requested from the host 170, according to a combination of commands or a state of the memory device 150. For example, the memory controller 100 may perform an error correction code (ECC) operation on the data read from the memory device 150 in order to detect and correct errors which occur in the read data. The ECC operation may require a different time depending on each of errors which occur in the read data. Thus, although commands are sequentially inputted from the host, data corresponding to the commands may not be sequentially processed. Therefore, each of the commands inputted from the host may include a data identifier DATA_ID for identifying data. For example, the data identifier DATA_ID may correspond to partial bits of the logical address of the data.

A read command READ_CMD may also include the data identifier DATA_ID. The command decoder 110 may generate the data identifier DATA_ID by decoding the read command READ_CMD. The generated data identifier DATA_ID may be applied to the data output control unit 120. The command decoder 110 may generate signals for a read operation of the memory device 150 as well as the data identifier DATA_ID, and the memory controller 100 may control the memory device 150 to read data iDATA according to the generated signals. Since the read operation of reading data iDATA from the memory device 150 is well known, detailed description of the read operation are omitted and are not displayed in FIG. 1.

The data output control unit 120 may include a data storage unit 130. When the data iDATA are read from the memory device 150, the data storage unit 130 may sequentially store the data iDATA and corresponding data identifiers DATA_IDs in the data storage unit 130. When the data iDATA and the data identifiers DATA_IDs are stored in the data storage unit 130, the data output control unit 120 generates a ready signal RD_RDY and transmits the ready signal RD_RDY to the host 170.

The ready signal RD_RDY may be generated whenever a predetermined number of data iDATA are stored. The ready signal RD_RDY may include information indicating the number of stored data. The host 170 may check the number of data iDATA which are stored in the data storage unit 130, based on the ready signal RD_RDY, and may generate the send command SEND_CMD according to the ready signal RD_RDY.

The command decoder 110 may receive the send command END_CMD from the host 170, decode the send command SEND_CMD, and generate an output signal OUT_EN, which indicates a data output. The command decoder 110 may send the output signal OUT_EN, to the data output control unit 120. At this time, the send command SEND_CMD does not include a data identifier DATA_ID, unlike the read command READ_CMD. In response to the output signal OUT_EN of the command decoder 110, the data output control unit 120 may sequentially output the data iDATA stored in the data storage unit 130 as the read data DATA to the host 170 as well as corresponding data identifiers DATA_ID. For example, the data storage unit 130 may include a first-in first-out buffer.

In accordance with an embodiment, the memory controller 100 may output first-read data iDATA to the host 170 regardless of the order of a corresponding read command RD_CMD. For read commands RD_CMD which have input times not significantly different from each other, the memory controller 100 may preferentially process the first-read data iDATA, thereby increasing the operating speed and improving the entire performance. However, for read commands RD_CMD which have input times that are different above a threshold difference from each other, the memory controller 100 may wait for read data DATA which have been requested earlier by the host. Therefore, the memory controller 100 may preferentially process the data iDATA of the read command RD_CMD which has been inputted earlier.

Figure 2:
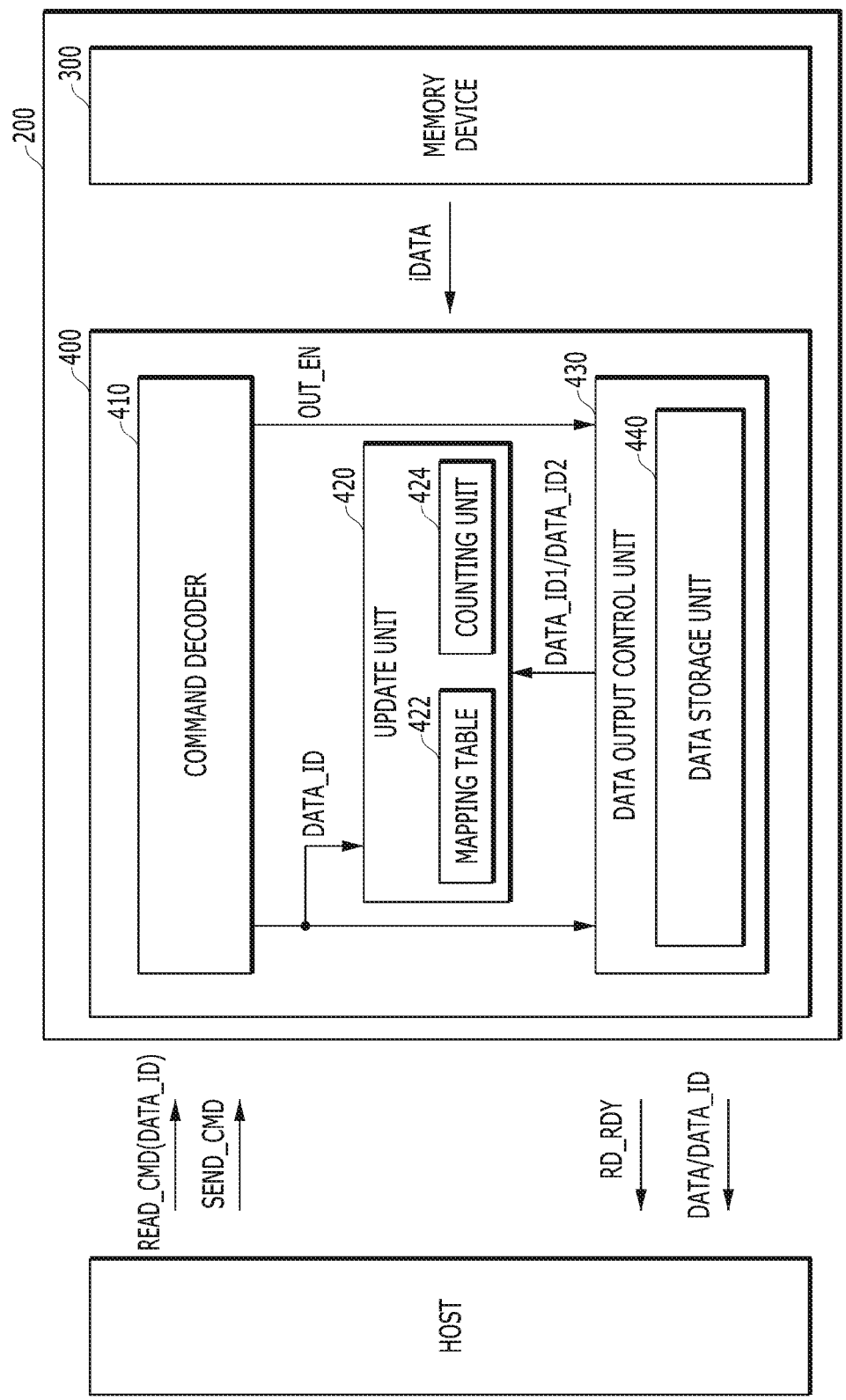
FIG. 2 is a block diagram illustrating a memory system including another memory controller operatively coupled to a memory device, and to a host, in accordance with another embodiment of the present invention.

FIG. 2 is a block diagram illustrating a memory system 200 in accordance with another embodiment.

Referring to FIG. 2, the memory system 200 may include a memory device 300 and a memory controller 400. The memory device 300 may include a volatile memory device and/or a nonvolatile memory device for storing data iDATA. For example, the memory device 300 may include a DRAM and NAND flash memory device. In an embodiment, the memory system 200 may be a nonvolatile dual in-line memory module (NVDIMM).

The memory controller 400 may control the memory device 300 to read data iDATA in response to read commands READ_CMD inputted from a host. The memory controller 400 may set the order of data (i.e., read data DATA) requested from the host according to the read commands READ_CMD and output the data iDATA read from the memory device 300 to the host according to the set order.

FIG. 2 illustrates only components related to the embodiment, among various components which may be included in the memory controller 400. The memory controller 400 may include a command decoder 410, an update unit 420 and a data output control unit 430. Compared to the embodiment of FIG. 1, the memory controller 400 includes in addition the update unit 420. Therefore, descriptions of the operations of the other components of the memory controller 400 which are the same to the components of the memory controller 100 of FIG. 1 are omitted herein.

The command decoder 410 may decode a read command READ_CMD, and generate an data identifier DATA_ID of data requested from the host, that is, read data DATA. The generated data identifier DATA_ID may be applied to the update unit 420 and the data output control unit 430. The command decoder 410 may decode a send command SEND_CMD, and send a signal OUT_EN indicating a data output to the data output control unit 430.

The update unit 420 may update information of the read data DATA in response to the data identifier DATA_ID sent from the command decoder 410. The update unit 420 may include a mapping table 422. The mapping table 422 may store as the information of the read data DATA the data identifier DATA_ID of the read data DATA and state information of the read data DATA. The data identifier DATA_ID and state information of the read data DATA may be mapped to each other in the mapping table 422.

The update unit 420 may further include a counting unit 424 in accordance with the present embodiment. The counting unit 424 may perform a counting operation in response to the data identifier DATA_ID sent from the command decoder 410. When a predetermined time has elapsed after the data identifier DATA_ID was sent, based on the counting operation, the update unit 420 may update information of the read data DATA. The operation of the update unit 420 will be described in detail with reference to FIG. 3.

The data output control unit 430 may include a data storage unit 440. The data output control unit 430 may store data iDATA in the data storage unit 440, the data iDATA being read from the memory device 300 in response to the read command READ_CMD. Furthermore, the data output control unit 430 may check the information, which is updated by the update unit 420, in response to the output signal OUT_EN of the command decoder 410. Based on the checked information, the data output control unit 430 may selectively output the data iDATA stored in the data storage unit 440 as read data DATA.

When storing the data iDATA read from the memory device 300, the data output control unit 430 may output to the update unit 420 data identifier DATA_ID1 corresponding to the data iDATA read from the memory device 300. As described above, the command decoder 410 may provide the data output control unit 430 with data identifier DATA_ID of read data DATA corresponding to which is requested from the host upon reception of the read command READ_CMD from the host. Furthermore, when selectively outputting the stored data iDATA as the read data DATA, the data output control unit 430 may output to the update unit 420 data identifier DATA_ID2 corresponding to the output read data DATA. In response to the data identifier DATA_ID1/DATA_ID2 inputted from the data output control unit 430, the update unit 420 may update the information of the read data DATA.

As described with reference to FIG. 1, the data output control unit 430 may also generate a ready signal RD_RDY and send the generated ready signal RD_RDY to the host when the data iDATA are stored in the data storage unit 440. However, since such operations have been described with reference to FIG. 1, detailed descriptions thereof are omitted with reference to FIG. 2. The data output control unit 430 may selectively output the data iDATA of the data storage unit 440 according to the updated information, and the data storage unit 440 may include an SRAM.

FIG. 3 is a table illustrating various pieces of information which are stored in the mapping table 422 of FIG. 2 according to an operation of the memory controller 400.

The data identifiers DATA_ID of the read data DATA may be allocated to the mapping table 422. The number of allocated data identifiers DATA_ID may differ depending on the size of the read data DATA. FIG. 3 illustrates, as an example, that data identifiers DATA_ID of 0 to 255 are allocated. However, it is noted that the present embodiment may not be limited in this way.

The mapping table 422 may also store ready state information READY for the read DATA. The ready state information READY may indicate whether the read data DATA are ready. That is, when read data DATA requested from the host are read from the memory device 300 and are ready to be outputted, the update unit 420 may set the ready state information READY. When the data identifier DATA_ID1 of the stored data is inputted from the data output control unit 430, the update unit 420 may set the ready state information READY corresponding to the data identifier DATA_ID1.

When the read data DATA requested from the host are outputted in the ready state, the update unit 420 may reset the ready state information READY. When receiving the data identifier DATA_ID2 of the data outputted from the data output control unit 430, the update unit 420 may reset the ready state information READY corresponding to the data identifier DATA_ID2.

FIG. 3 shows that the ready state information READY for each of the second, third and sixth data identifiers of 1, 2 and 5 is set to a logical level 'H'. That is, the data of the second, third and sixth data identifiers of 1, 2 and 5 may be read from the memory device 300, and stored in the data output control unit 430. On the other hand, the ready state information READY for each of the first, fourth and fifth data identifiers of 0, 3 and 4 may be set (or reset) to a logical level 'L', which indicates that the data of the first, fourth and fifth data identifiers of 0, 3 and 4 have been already outputted or are not yet read from the memory device 300.

The mapping table 422 may further store order information ORDER indicating the request orders of the read data DATA as well as the ready state information READY. That is, when the read data DATA are requested from the host, the update unit 420 may sequentially set the order information ORDER. When a data identifier DATA_ID of read data DATA generated through the command decoder 410 is inputted, the update unit 420 may increase the order information ORDER corresponding to the data identifier DATA_ID by '1'.

FIG. 3 shows that the read data DATA corresponding to the second, third, fourth and sixth data identifiers of 1, 2, 3 and 5 are sequentially requested from the host, and the order information ORDER corresponding to the read data DATA is sequentially set. When resetting the ready state information READY of the mapping table 242, the update unit 240 may decrease the set order information ORDER by one.

For example, when the read data DATA corresponding to the second data identifier of 1 is selected and outputted by the data output control unit 430, the update unit 420 may reset the ready state information READY corresponding to the second data identifier of 1. At this time, the update unit 420 may decrease the order information ORDER of the other data identifiers or the third, fourth and sixth data identifiers of 2, 3 and 5 by one, while deleting the order information ORDER corresponding to the second data identifier of 1.

The mapping table 422 may further store valid state information VALID indicating whether the read data DATA have been requested, as well as the order information ORDER. In response to the data identifier DATA_ID of the read data DATA generated through the command decoder 410, the update unit 420 may set the valid state information VALID corresponding to the input data identifier DATA_ID to the logical level 'H'. In response to the read data DATA outputted to the host by the data output control unit 430, the update unit 420 may reset the valid state information VALID corresponding to the read data DATA to the logical level That is, according to the data identifier DATA_ID2 of the read data DATA inputted from the data output control unit 430, the update unit 420 may reset the valid state information VALID corresponding to the data identifier DATA_ID2 to the logical level 'L'. The valid state information VALID may be used when the update unit 240 decreases the set order information ORDER by one.

In accordance with the present embodiment, the mapping table 422 may further store time information TIME for the read DATA, the time information TIME indicating how much time has elapsed after the read data DATA were requested. In other words, when the read data DATA requested from the host is not yet outputted when a predetermined time elapses, the update unit 420 may set the time information TIME. When the data identifier DATA_ID of the read data DATA generated through the command decoder 410 is inputted, the counting unit 424 of the update unit 420 may perform a counting operation. When the counting value by the counting operation reaches a reference value, the update unit 420 may then set the time information TIME corresponding to the input data identifier DATA_ID to the logic level 'H'. In response to the read data DATA outputted to the host, the update unit 420 may reset the time information TIME corresponding to the read data DATA to the logical level 'L'. That is, according to the data identifier DATA_ID2 of the read data DATA inputted from the data output control unit 430, the update unit 420 may reset the time information TIME corresponding to the data identifier DATA_ID2 to the logical level 'L'.

As described above, the data output control unit 430 may check the information of the read data DATA stored in the mapping table 422, and selectively output the data stored in the data storage unit 440 as the read data DATA. With reference to the information of the read data DATA illustrated in FIG. 3, an operation of the data output control unit 430 may be described as follows.

The data output control unit 430 may first check data identifiers in which the ready state information READY is set, that is, data identifiers with the logical level 'H' of the ready state information READY. Hence, according to the mapping table of FIG. 3, the second, third and sixth data identifiers of 1, 2 and 5 may be selected. The data output control unit 430 may finally check the data identifier having the lowest order information ORDER among the second, third and sixth data identifiers of 1, 2, and 5, that is, the second data identifier of 1.

The data output control unit 430 may output data corresponding to the checked data identifier of 1 among the data stored in the data storage unit 440 as the read data DATA. That is, the data output control unit 430 may primarily check the data identifiers of data which are read from the memory device 300 and stored in the data storage unit 440, finally check the data identifier of the data corresponding to the oldest read request, and output the corresponding data to the host.

In accordance with another embodiment, the data output control unit 430 may check data identifiers in which the ready state information READY and the time information TIME are set, that is, data identifiers with the logical level 'H' of the ready state information READY and the time information TIME. According to FIG. 3, the second and third data identifiers of 1 and 2 may be selected. The data output control unit 430 may finally check one of the second and third data identifiers of 1 and 2 in a random manner, for example, the second data identifier of 1.

The data output control unit 430 may output data corresponding to the checked data identifier of 1 among the data stored in the data storage unit 440 as the read data DATA. The data output control unit 430 may select only the data identifiers of data whose read requests have elapsed for a predetermined time, among the data which are read from the memory device 300 and stored in the data storage unit 440, and output the corresponding data.

In accordance with the present embodiment, the data output control unit 430 may properly combine the ready state information READY, the order information ORDER, the time information TIME and the valid state information VALID or use a part of the ready state information READY, the order information ORDER, the time information TIME and the valid state information VALID, in order to output the read data DATA. For example, the data output control unit 430 may primarily check data identifiers in which the ready state information READY and the time information TIME are set, and additionally check the data identifier having the lowest order information ORDER among the primarily checked data identifiers. That is, the data output control unit 430 may randomly output data whose read request times have elapsed by a predetermined time, among the data which are read from the memory device 300 and ready to be outputted, or additionally select older data among the data. Therefore, the data output control unit 430 can adjust the amount of information to check or the number of data identifiers while satisfying the request of the host to some extent, thereby improving the performance.

Figure 4:
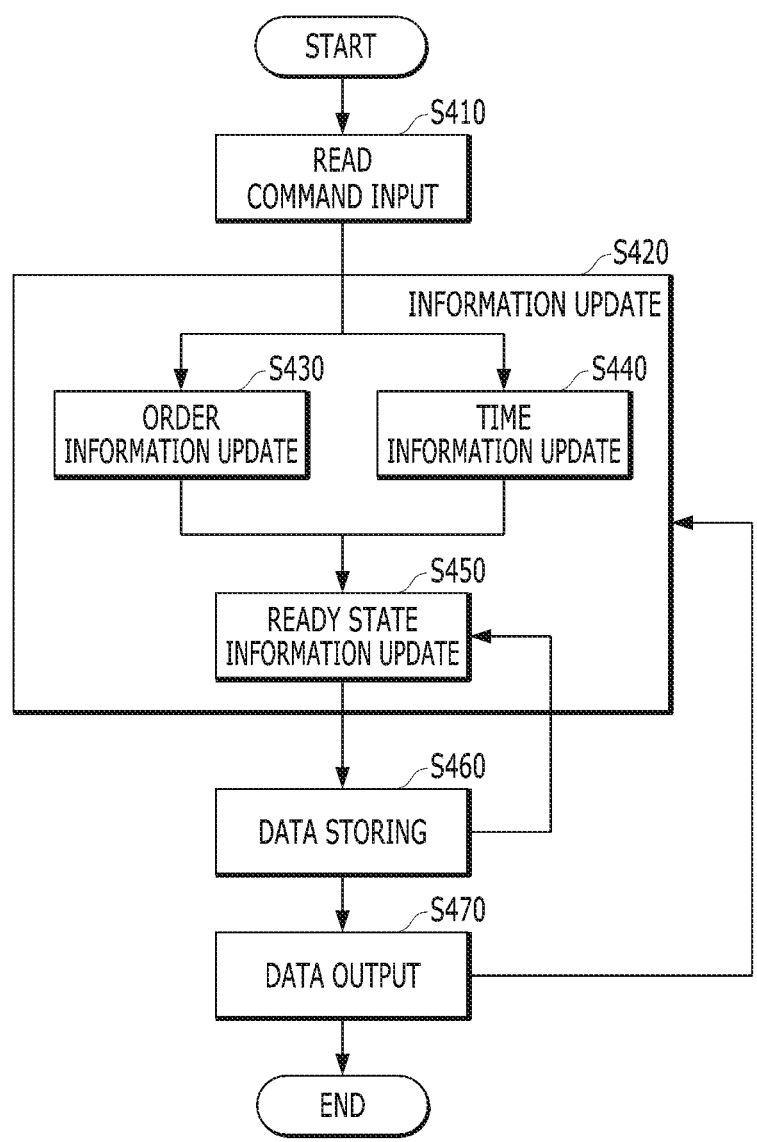
FIG. 4 is a flowchart illustrating an operation of a memory system in accordance with an embodiment of the present invention.

FIG. 4 is a flowchart of an operation of the memory system in accordance with an embodiment of the present invention Read Command Input at Step S410

When read commands READ_CMD are inputted from the host, the command decoder 410 may decode the read commands READ_CMD and generate data identifiers DATA_ID for the read data DATA. The data identifiers DATA_ID of the read data DATA may be applied to the update unit 420 and the data output control unit 430.

Information Update at Step S420

The update unit 420 may update the information of the read data DATA according to the data identifiers DATA_ID of the read data DATA. First, the update unit 420 may update the order information ORDER of the read data DATA at step S430. The update unit 420 may sequentially set the order information ORDER corresponding to the data identifiers DATA_ID of the read data DATA.

Alternatively, the update unit 420 may update the time information TIME of the read data DATA at step S440. The counting unit 424 may perform a counting operation in response to the data identifiers DATA_ID of the read data DATA. When a predetermined time has elapsed based on the counting operation, the update unit 420 may set the time information TIME corresponding to the data identifiers DATA_ID of the read data DATA.

Furthermore, the update unit 420 may update the ready state information READY of the read data DATA at step S450. As the data iDATA read from the memory device 300 are stored in the data storage unit 440 at step S460, the update unit 420 may set the ready state information READY corresponding to the data identifier DATA_ID1 of the read data iDATA. As the data output control unit 430 outputs the read data DATA at step S470, the update unit 420 may reset the order information ORDER, the time information TIME and the ready state information READY corresponding to the data identifier DATA_ID2 of the output read data DATA.

Data Storage and Output at Step S460 and S470

The data output control unit 430 may store the data iDATA read from the memory device 300 in the data storage unit 440 at step S460. Based on the information updated by the update unit 420, the data output control unit 430 may selectively output the data stored in the data storage unit 440 as the read data DATA at step S470.

The data output control unit 430 may check the information of the read data DATA in response to the send command SEND_CMD, that is, the output signal OUT_EN of the command decoder 410. The data output control unit 430 may check the data identifier having the lowest order information ORDER among the data identifiers in which the ready state information READY is set. The data output control unit 430 may output the data of the checked data identifier, among the data iDATA read from the memory device 300, as the read data READ.

Alternatively, the data output control unit 430 may check data identifiers in which the read state information READY and the time information TIME are set. The data output control unit 430 may randomly select one data identifier among the checked data identifiers, and output the data of the selected data identifier, among the data iDATA read from the memory device 300, as the read data READ.

In accordance with the described embodiments, the memory controller can set various pieces of information on read data, based on read operation requests and read operation results. Furthermore, the memory controller may decide the priority of the read data by combining the set information, and process the read data according to the decided priority. Therefore, according to the information combination, the memory controller can optimize the performance of the memory device, and reduce the waiting time of the host.

Although various embodiments have been described for illustrative purposes, it will be apparent to those skilled in the art that various changes and modifications may be made without departing from the spirit and scope of the invention as defined in the following claims.

What is claimed is:

1. A memory controller comprising:
 a command decoder suitable for generating a data identifier of read data by decoding a read command;
 an update unit suitable for updating information of the read data in response to the data identifier of the read data; and
 a data output control unit suitable for storing data read from a memory device according to the read command, and selectively outputting the stored data as the read data based on the updated information,
 wherein the information of the read data comprises time information, and
 wherein the update unit performs a counting operation in response to the data identifier of the read data and sets time information corresponding to the data identifier of the read data when a predetermined time elapses according to the counting operation.

2. The memory controller of claim 1, wherein the data output control unit outputs the data identifiers of the stored data and the outputted read data to the update unit, and the update unit updates the information of the read data in response to the data identifiers of the stored data and the outputted read data.

3. The memory controller of claim 2,
 wherein the information of the read data further comprises ready state information, and
 wherein the update unit sets ready state information corresponding to the data identifier of the stored data, and resets ready state information corresponding to the data identifier of the outputted read data.

4. The memory controller of claim 3,
 wherein the information of the read data further comprises order information, and
 wherein the update unit sequentially sets order information corresponding to the data identifier of the read data.

5. The memory controller of claim 4, wherein when resetting the ready state information, the update unit decreases the sequentially set order information by one.

6. The memory controller of claim 5,
 wherein the information of the read data further comprises valid state information, and
 wherein the update unit sets valid state information corresponding to the data identifier of the read data, and resets valid state information corresponding to the data identifier of the outputted read data.

7. The memory controller of claim 4, wherein the data output control unit checks a data identifier having the lowest order information among data identifiers having the ready state information set, and outputs data of the checked data identifier among the stored data as the read data.

8. The memory controller of claim 3, wherein the data output control unit randomly checks one data identifier among data identifiers having the ready state information and the time information set, and outputs data of the checked data identifier among the stored data as the read data.

9. The memory controller of claim 1, wherein the command decoder decodes a send command, and sends the decoded send command to the data output control unit.

10. The memory controller of claim 9, wherein the data output control unit checks the updated information and outputs the read data, in response to the decoded send command.

11. An operation method of a memory system, comprising:
 generating a data identifier of read data by decoding a read command;
 updating information of the read data according to the data identifier of the read data;
 storing data read from a memory device according to the read command; and
 selectively outputting the stored data as the read data based on the updated information,
 wherein the updating of the information of the read data comprises:
 performing a counting operation in response to the generated data identifier of the read data; and
 setting time information corresponding to the generated data identifier of the read data, when a predetermined time elapses according to the counting operation.

12. The operation method of claim 11, wherein the updating of the information of the read data comprises sequentially setting order information corresponding to the data identifier of the read data.

13. The operation method of claim 12, wherein the updating of the information of the read data comprises:
   setting ready state information corresponding to the data identifier of the stored data; and
   resetting ready state information corresponding to the data identifier of the outputted read data.

14. The operation method of claim 13, wherein the outputting of the stored data as the read data comprises:
   checking a data identifier having the lowest order information among data identifiers having the ready state information set; and
   outputting data of the checked data identifier among the stored data, as the read data.

15. The operation method of claim 11, wherein the updating of the information of the read data comprises:
   setting ready state information corresponding to the data identifier of the stored data; and
   resetting ready state information corresponding to the data identifier of the outputted read data.

16. The operation method of claim 15, wherein the outputting of the stored data as the read data comprises:
   randomly checking one data identifier among data identifiers having the ready state information and the time information set; and
   outputting data of the checked data identifier among the stored data, as the read data.

17. The operation method of claim 11, wherein the outputting of the stored data as the read data comprises:
   checking the updated information in response to a send command; and
   selectively outputting the stored data as the read data based on the checked update information.

18. A memory system comprising:
   a memory device suitable for providing stored data in response to read commands; and
   a memory controller suitable for setting an order of the provided data, and outputting to a host the provided data in the set order,
   wherein the memory controller sets the order of the provided data by performing a counting operation in response to the read commands and setting time information corresponding to the provided data when a predetermined time elapses according to the counting operation.

19. The memory system of claim 18, wherein the memory controller sets the order of the stored data based on an input order or an input time of the read commands for the stored data.

* * * * *